United States Patent
Anderson et al.

(10) Patent No.: US 9,317,546 B2
(45) Date of Patent: Apr. 19, 2016

(54) STORING CHANGES MADE TOWARD A LIMIT

(71) Applicant: International Business Machines Corporation, Armonk, NY (US)

(72) Inventors: Mark J. Anderson, Oronoco, MN (US); Scott Forstie, Rochester, MN (US); Randy S. Johnson, Dodge Center, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 13/874,529

(22) Filed: May 1, 2013

(65) Prior Publication Data

US 2014/0330823 A1 Nov. 6, 2014

(51) Int. Cl.
*G06F 17/30* (2006.01)

(52) U.S. Cl.
CPC .... *G06F 17/30312* (2013.01); *G06F 17/30138* (2013.01)

(58) Field of Classification Search
None
See application file for complete search history.

(56) References Cited

U.S. PATENT DOCUMENTS

| 7,552,450 B1* | 6/2009 | Evans | G06F 8/36 386/239 |
| 2005/0149537 A1* | 7/2005 | Balin | G06F 17/303 |
| 2008/0133546 A1* | 6/2008 | Phillips | G06Q 10/08 |

OTHER PUBLICATIONS

Scott Forstie, A new type of health indicator is available to help you understand when the system is trending towards an outage or serious condition, https://www.ibm.com/developerworks/mydeveloperworks/wikis/home/wiki/IBM%20i%20Technology%20Updates/page/Tracking%20Important%20System%20Limits?lang=en, Mar. 2007, pp. 1-3.

IBM Application Runtime Expert for i, http://www-03.ibm.com/systems/power/software/i/are/usage.html, Mar. 15, 2013, pp. 1-2.

* cited by examiner

*Primary Examiner* — Jay Morrison
(74) *Attorney, Agent, or Firm* — Owen J. Gamon; Roy W. Truelson

(57) ABSTRACT

A program identifier, a limit identifier, a minimum value, and an increment value are stored to limit data. The limit identifier identifies a first variable used by the program. In response to storing a data value to a second variable, the stored limit identifier is found and a determination is made whether the stored limit identifier identifies the second variable. If the stored limit identifier identifies the second variable, a determination is made whether the data value is greater than the minimum value. If the data value is greater than the minimum value, the data value is stored to a log if an absolute value of the data value minus a most recently logged data value that was previously stored to the second variable is greater than the increment value. The execution of the program is halted or a user is notified in response to the storing to the log.

20 Claims, 5 Drawing Sheets

| | | | | | | LIMIT DATA 144 | | |
|---|---|---|---|---|---|---|---|---|
| | | | | | | | LOG 220 | |
| 210 | 212 | 214 | 216 | 218 | | 222 | 224 | 226 |
| PROGRAM ID | LIMIT ID | MAX | MIN | INCREMENT | | USER ID | TIMESTAMP | DATA VALUE |
| OS A | THREAD NUMBER | 256 | 128 | 10 | | USER A<br>JOB B<br>USER B | 13-01-02 8:15<br>13-01-02 8:17<br>13-01-02 8:18 | 128<br>138<br>128 |
| DBMS B | TABLE SIZE | 99999 GB | 5000 GB | 200 GB | | USER B<br>USER C<br>USER D | 13-01-03 9:10<br>13-01-03 9:17<br>13-02-08 7:22 | 5000<br>5200<br>5400 |
| DBMS C | INDEX SIZE | 9999 GB | 4000 GB | 10 GB | | USER C<br>USER C<br>USER A<br>JOB A<br>JOB B | 13-01-03 7:10<br>13-01-03 7:17<br>13-01-22 7:22<br>13-01-25 9:14<br>13-01-25 9:15 | 4000<br>4010<br>4020<br>4030<br>4020 |

| PROGRAM ID (210) | LIMIT ID (212) | MAX (214) | MIN (216) | INCREMENT (218) | LOG (220) | | |
|---|---|---|---|---|---|---|---|
| | | | | | USER ID (222) | TIMESTAMP (224) | DATA VALUE (226) |
| OS A | THREAD NUMBER | 256 | 128 | 10 | USER A<br>JOB B<br>USER B | 13-01-02 8:15<br>13-01-02 8:17<br>13-01-02 8:18 | 128<br>138<br>128 |
| DBMS B | TABLE SIZE | 99999 GB | 5000 GB | 200 GB | USER B<br>USER C<br>USER D | 13-01-03 9:10<br>13-01-03 9:17<br>13-02-08 7:22 | 5000<br>5200<br>5400 |
| DBMS C | INDEX SIZE | 9999 GB | 4000 GB | 10 GB | USER C<br>USER C<br>USER A<br>JOB A<br>JOB B | 13-01-03 7:10<br>13-01-03 7:17<br>13-01-22 7:22<br>13-01-25 9:14<br>13-01-25 9:15 | 4000<br>4010<br>4020<br>4030<br>4020 |

LIMIT DATA (144)

FIG. 2

STORING CHANGES MADE TOWARD A LIMIT

FIELD

An embodiment of the invention generally relates to computer systems and more particularly to a computer systems that have program and data limits.

BACKGROUND

Computer systems typically comprise a combination of hardware, such as semiconductors, transistors, chips, and circuit boards, and computer programs, which execute on the hardware. Computer systems are fundamentally used for the storage and analysis of data. Data and programs typically have architected limits, such as the maximum number of objects capable of being stored in a library or directory or the maximum size of a database table. When the data and/or the program reach the architected limit, some user intervention is typically required, in order for the computer system to continue to function normally, such as deleting or reorganizing some of the data, creating a new library, directory, or table or adding more memory, processors, or other resources to the computer system.

SUMMARY

A method, computer-readable storage medium, and computer are provided. In an embodiment, a limit of a program is registered by storing a program identifier, a limit identifier, a minimum value, and an increment value to limit data. The limit identifier identifies a first variable used by the program. In response to storing a data value to a second variable, the stored limit identifier is found and a determination is made whether the stored limit identifier identifies the second variable. If the stored limit identifier identifies the second variable, then the second variable is identical to the first variable, so a determination is made whether the data value is greater than the minimum value. If the data value is greater than the minimum value, the data value is stored to a log of the limit identifier if an absolute value of the data value minus a most recently logged data value that was previously stored to the second variable is greater than the increment value. In various embodiments, the execution of the program may be halted or a user may be notified, in response to the storing to the log.

BRIEF DESCRIPTION OF THE SEVERAL VIEWS OF THE DRAWINGS

FIG. 2 depicts a block diagram of an example data structure for limit data, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
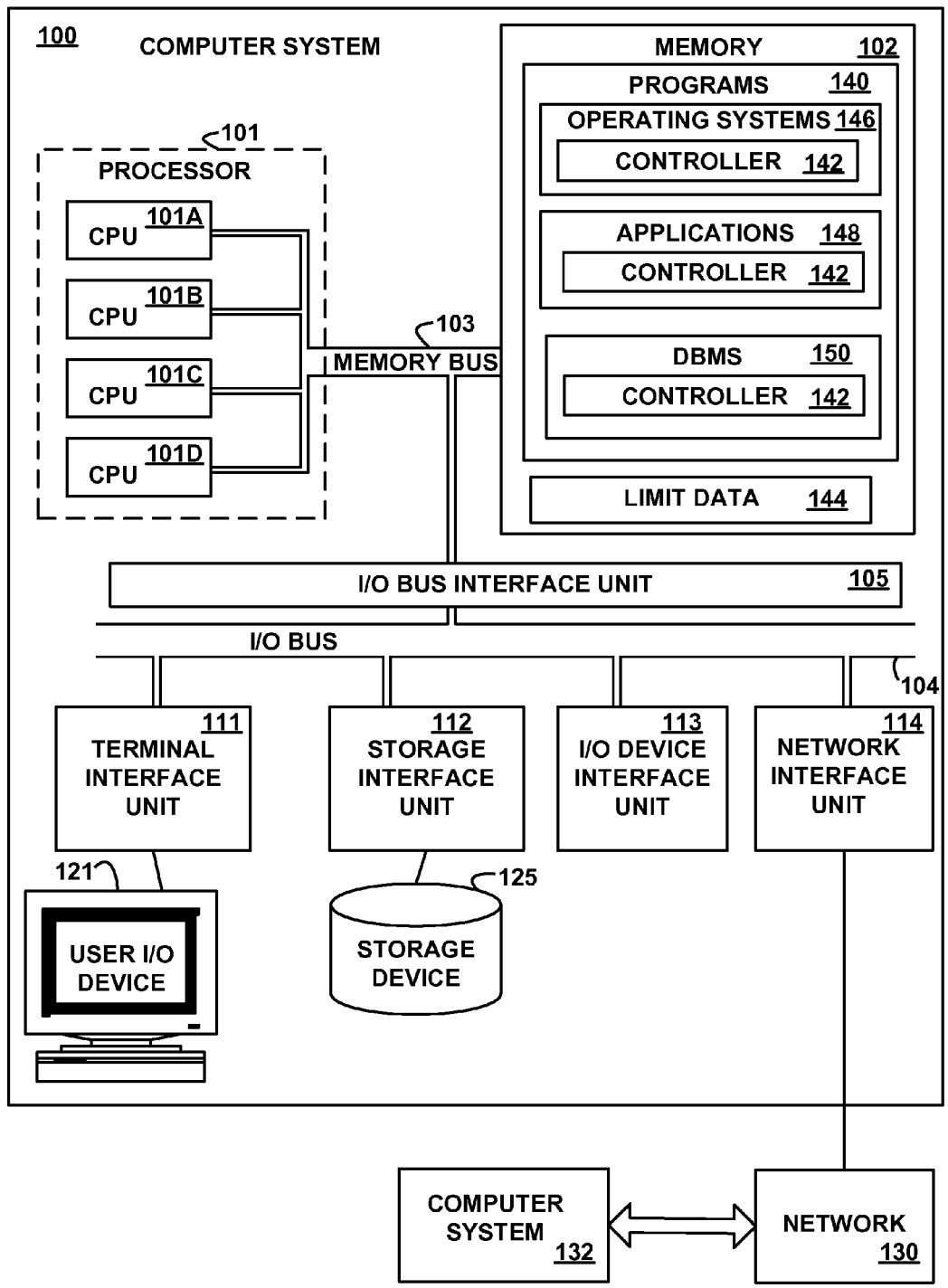
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to another computer system 132 via a network 130, according to an embodiment of the present invention. The mechanisms and apparatus of embodiments of the present invention apply equally to any appropriate computing system. The major components of the computer system 100 comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes programs 140 and limit data 144. Although the programs 140 and the limit data 144 are illustrated as being contained within the memory 102 in the computer system 100, in other embodiments some or all of them may be on different computer systems and may be accessed remotely, e.g., via the network 130. For example, the programs 140 and the limit data 144 may be stored in memory in the computer system 132. The computer system 100 may use virtual addressing mechanisms that allow the programs of the computer system 100 to behave as if they only have access to a large, single storage entity instead of access to multiple, smaller storage entities. Thus, while the programs 140 and the limit data 144 are illustrated as being contained within the memory 102, these elements are not necessarily all completely contained in the same storage device at the same time. Further, although the programs 140 and the limit data 144 are illustrated as being separate entities, in other embodiments some of them, portions of some of them, or all of them may be packaged together.

The programs 140 may comprise any operating system, user application, third party application, or any multiple or combination thereof, such as the operating systems 146, the applications 148, and the DBMS (Database Management System) 150. Although the controller 142 is illustrated as being embedded within the operating systems 146, the applications 148, and the DBMS (Database Management System) 150 of the programs 140, in another embodiment the functions or logic of the controller 142 may be separate from the example operating systems 146, the applications 148, and the DBMS 150.

In an embodiment, the programs 140 and/or the controller 142 comprise instructions that execute on the processor 101 or statements that are interpreted by instructions executing on the processor 101 to perform the functions, as further described below with reference to FIGS. 2, 3, 4, and 5. In another embodiment, the programs 140 and/or the controller 142 may be implemented in microcode or firmware. In another embodiment, the programs 140 and/or the controller 142 may be implemented in hardware via logic gates, semiconductor devices, chips, circuits, circuit cards, and/or other physical hardware devices.

The memory bus 103 provides a data communication path or communications fabric for transferring data among the processor 101, the memory 102, and the I/O bus interface unit 105. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices, which may comprise user output devices (such as a video display device, projectors, a speaker, and/or television set) and user input devices (such as a camera, a keyboard, a mouse, a keypad, a touchpad, a trackball, buttons, Radio Frequency Identifier Tags, a light pen, a finger, a stylus, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device. The user I/O device 121 may be of any size and may accommodate multiple users viewing and touching the display device simultaneously or collaboratively, and in an embodiment, any user may touch at any location on the display device.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the computer system 100 may, in fact, contain multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable bus, network, or any multiple or combination thereof, and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable bus, network, or any multiple or combination thereof.

The computer system 132 may comprise some or all of the hardware and/or computer program elements of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

FIG. 2 depicts a block diagram of an example data structure for the limit data 144, according to an embodiment of the invention. The example limit data 144 comprises any number of entries, each comprising a program ID (identifier) field 210, a limit identifier field 212, a max (maximum) value field 214, a min (minimum) value field 216, an increment value field 218, and a log field 220.

The log field 220 comprises, in each entry, a user identifier field 222, a timestamp field 224, and a data value field 226, each of which may comprise multiple values, in multiple respective rows. The user identifier field 222, in each entry, specifies an identifier (in each row of the respective entry) of the user, the job, or the application that requested that the program 140 (identified by the program identifier field 210 in the same entry) be executed or that requested that the variable (specified by the limit identifier 212 in the same entry) be changed to contain the data value 226, specified in the same row in the same entry at the time and/or date specified by the timestamp 224, in the same row in the same entry. The program identifier field 210, in each entry, identifies one of the programs 140. The limit identifier field 212, in each entry, identifies a variable (a storage location, a field, or a row) in the memory 102 or the storage device 125 that is read from and stored to by the program 140 identified by the program identifier field 210, in the same entry. The maximum value field 214, in each entry, specifies the maximum value that may exist in the variable identified by the limit identifier 212, in the same entry.

The minimum value field 216, in each entry, specifies the minimum value that needs to be in the variable identified by the limit identifier field 212, in the same entry, in order for the controller 142 to add the contents of the variable (identified by the limit identifier field 212, in the same entry) to the log field 220, in the same entry. That is, in each entry, all of the data values 226 in the log 220 are greater than the minimum value 216, in the same entry. Thus, although values less than the minimum value 216 may be valid to be stored, and may exist, in the variable in another database, data structure, or file, the controller 142 does not store values less than the minimum value 216 into the log 220. The processing that uses the minimum value 216 reduces overhead by ignoring trivial progress of values of the variable identified by the limit identifier 212 towards the maximum value 214.

The increment value 218, in each entry, specifies the minimum difference between the current value of the variable specified by the limit identifier 212, in the same entry, and the most recently logged value of the variable that must exist in order for the controller 142 to store the current value of the variable to the log 220, in the same entry. That is, all of the successive data values 226 in rows in the log 220 (which existed in the variable at different dates and/or times, indicated by the timestamp 224) have a difference between them of a minimum of the increment value 218, in the same entry. The processing that uses the increment value 218 reduces overhead by only saving data values 226 to the log 220 at boundaries defined by the increment value 218.

In various embodiments, the controller 142 may display or present the limit data 144 via the user I/O device 121 or may send selected portions of the limit data 144 to the user I/O device 121, to any of the programs 140, or to the computer 132, in response to queries. In various embodiments, the limit data 144 is implemented as a data structure, an object, a database, a table or tables in a database, a flat file, or any other appropriate organization of data.

Figure 3:
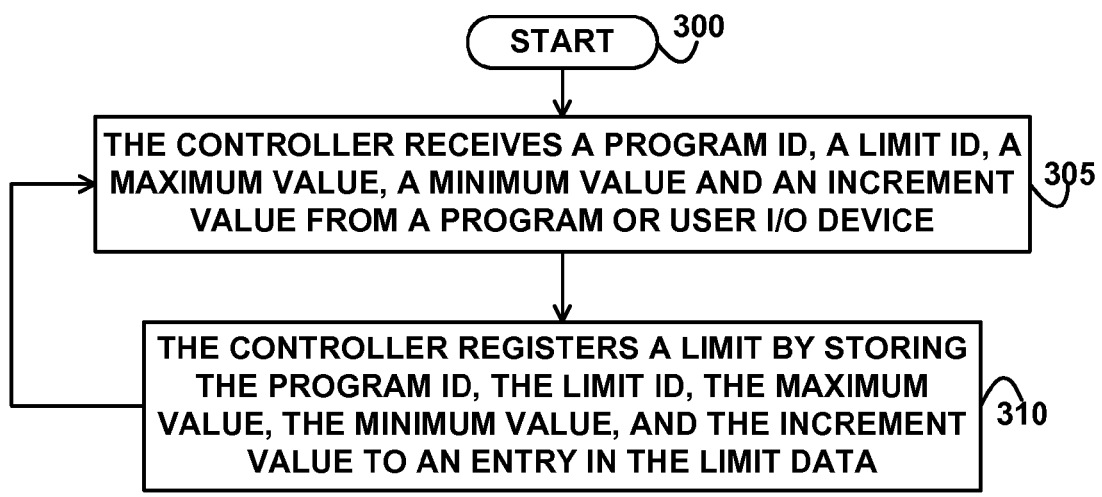
FIG. 3 depicts a flow chart of example processing for registering a limit, according to an embodiment of the invention.

FIG. 3 depicts a flow chart of example processing for registering a limit, according to an embodiment of the invention. Control begins at block 300. Control then continues to block 305 where the controller 142 receives a registration request that specifies a program identifier, a limit identifier, a maximum value, a minimum value, and an increment value from a program 140 or a user I/O device 121. The controller 142 may receive the registration request as a result of a command or request from a user of the program 140, from a user of the computer 100, or from an administrator. Control then continues to block 310 where, in response to the registration request, the controller 142 registers the limit by storing the program identifier, the limit identifier, the maximum value, and the increment value to a new entry in the limit data 144 or by modifying an existing entry. Control then returns to block 305 where the controller 142 receives another registration request from the same or a different program 140, which causes the controller 142 to create a new entry, modify the same entry, or modify a different entry in the limit data 144, as previously described above. In various embodiments, the logic of FIG. 3 executes asynchronously or in a background job from the logic of other portions of the programs 140, or the controller 142 stores entries in a buffer or queue temporarily before storing the entries to the limit data 144.

Figure 4:
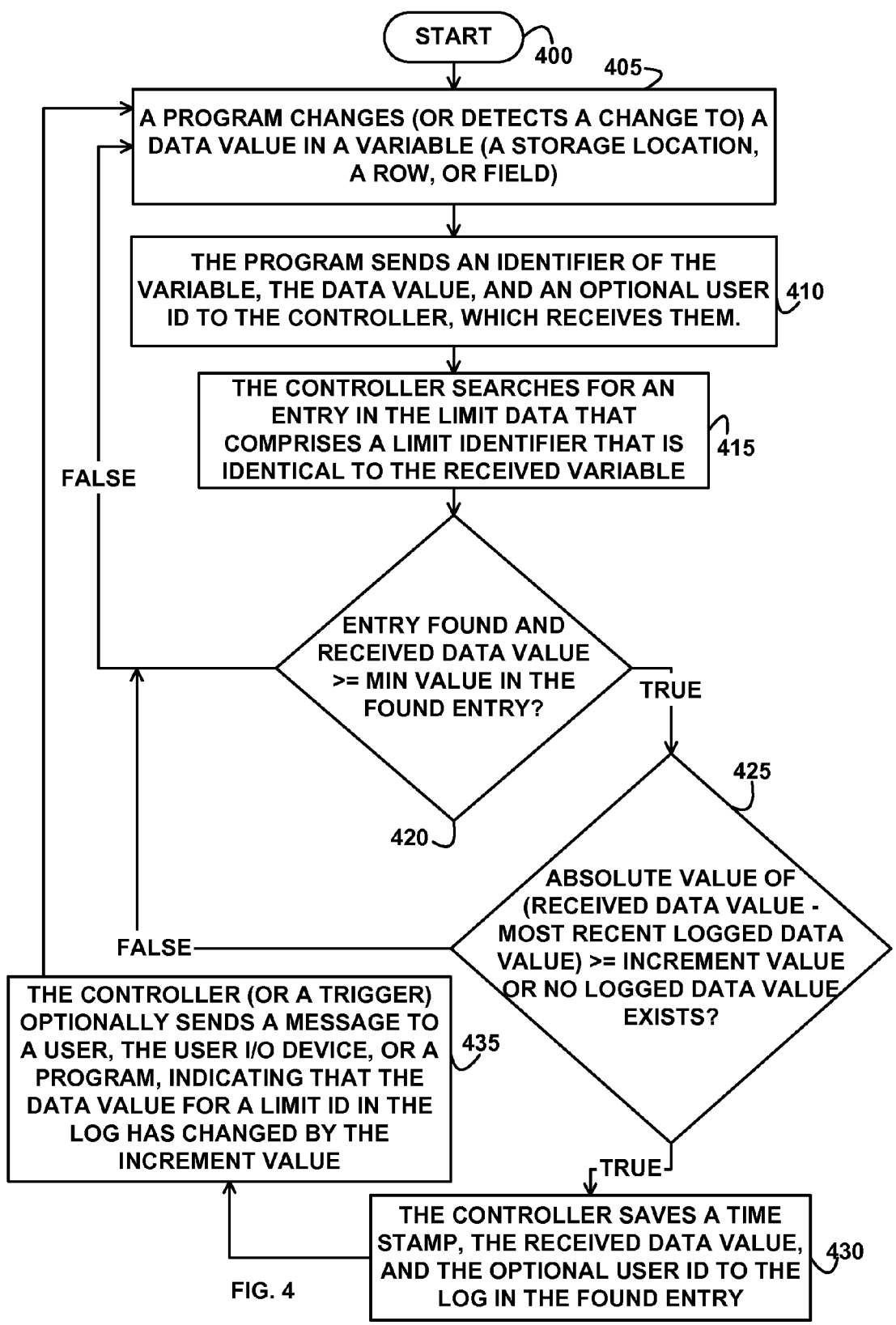
FIG. 4 depicts a flow chart of example processing for logging changes to the limit data, according to an embodiment of the invention.

FIG. 4 depicts a flow chart of example processing for logging changes to the limit data, according to an embodiment of the invention. Control begins at block 400. Control then continues to block 405 where a program 140 changes (or detects a change to) a data value in a variable (e.g., a storage location, a row, or a field). Control then continues to block 410 where the program 140 sends an identifier of the variable (e.g., a variable name, an address, a row identifier, or a field name), the data value that was changed in the variable or stored to the variable, and an optional user identifier of a user or job (that requested that the program 140 be executed, that executed the program 140, or that requested that the change to the variable be made) to the controller 142, which receives them. Control then continues to block 415 where the controller 142 searches for an entry in the limit data 144 that comprises a limit identifier that is identical to the received variable identifier.

Control then continues to block 420 where the controller 142 determines whether an entry in the limit data 144 is found that comprises a limit identifier 212 that is identical to the received variable and the received data value is greater than or equal to the minimum value 216 in the found entry. If the determination at block 420 is true, then the controller 142 found an entry in the limit data 144 that comprises a limit identifier 212 that is identical to the received variable (the variable identified by the limit identifier 212 and the received variable are identical) and the received data value is greater than or equal to the minimum value 216 in the found entry, so control continues to block 425 where the controller 142 determines whether the absolute value of (the received data value minus the most recent data value that the controller 142 stored to the log of the found entry) is greater than or equal to the increment value 218 in the found entry or no data value 226 exists in the log of the found entry. The absolute value |☐x☐| of a real number x is the non-negative value of x without regard to its sign. Thus, |☐x☐|=x for a positive x, |☐x☐|=−x for a negative x, and |☐0☐|=0. The controller 142 determines the most recent data value to be the data value 226 in a row of the found entry whose timestamp 224, in the same row, is the nearest to the current date and/or time, as compared to other timestamps in the same entry. In an embodiment, the controller 142 only considers, as the most recent data value, the data value 226 with a user identifier 222 that is identical to the user or job identifier assigned to the program 140 that stored the received data value to the variable. In an embodiment, the logic of blocks 420 and 425 may be performed by the program 140 between blocks 405 and 410.

If the determination at block 425 is true, then the absolute value of (the received data value minus the most recent data value that the controller 142 stored to the log of the found entry) is greater than or equal to the increment value 218 in the found entry or no data value 226 exists (no most recently logged data value exists) in the log 220 of the found entry, so control continues to block 430 where the controller 142 saves a timestamp that indicates the current date and/or time, the received data value, and an optional user identifier to a row in the log 220 of the found entry. Control then continues to block 435 where the controller 142 (or optionally a database trigger) optionally takes an action, such as suspending execution of the program or job that stored the data value to the variable or sending a message, alert, or notification to a user, the user I/O device 121, the program 140 that changed the variable, or any other program 140, indicating that the data value for a limit identifier 212 in the log 220 has changed by the increment value 218. A database trigger is logic or code that is executed automatically in response to certain events, such as a row being added to a database table. Since, in an embodiment, the trigger notifies the user or suspends the program or job each time the data value 226 changes by the increment value 218, the user may detect trends or run-away conditions in the variable and take actions to address the problem in real time. Control then returns to block 405, where the same or a different program 140 changes (or detects a change to) the same or a different variable, as previously described above.

If the determination at block 425 is false, then the absolute value of (the received data value minus the most recent data value that the controller 142 stored to the log of the found entry) is less than the increment value 218 in the found entry, so control returns to block 405, as previously described above, without storing the received data value to the found entry in the log.

If the determination at block 420 is false, then the controller 142 did not found an entry in the limit data 144 that comprises a limit identifier 212 that is identical to the received variable (any entries the controller 142 read from the limit data 144 had limit identifiers 212 that identified variables that are not identical to the received variable) or the received data value is less than the minimum value 216 in a found entry that comprises a limit identifier 212 that identifies a variable that is identical to the received variable, so control returns to block 405 as previously described above, without storing the received data value to any log 220 of any entry.

Figure 5:
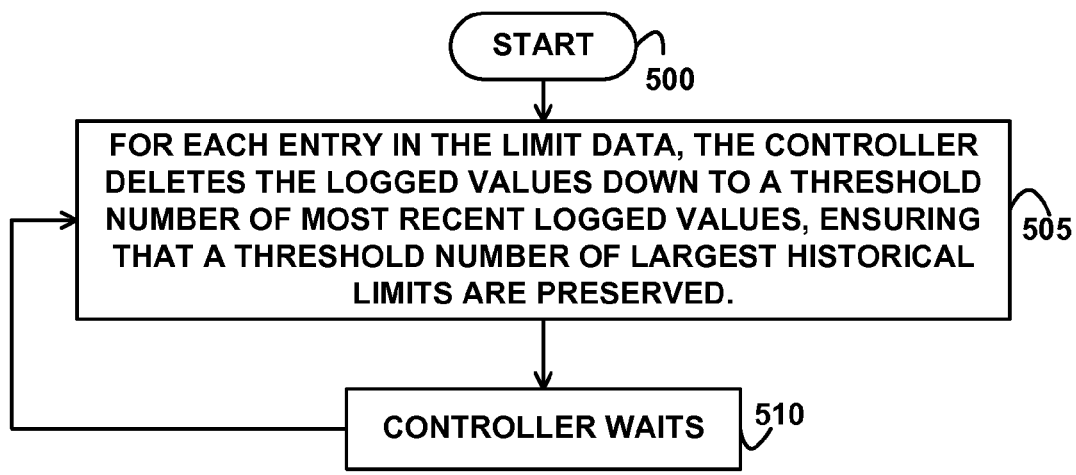
FIG. 5 depicts a flow chart of example processing for removing logged data values from the limit data, according to an embodiment of the invention.

FIG. 5 depicts a flow chart of example processing for removing logged data values from the limit data, according to an embodiment of the invention. Control begins at block 500. Control then continues to block 505 where, for each entry in the limit data 144, the controller 142 deletes the logged data values down to a threshold number of most recent logged values, ensuring that a threshold number of largest historical limits are preserved. The controller 142 determines the logged data values to delete by reading the timestamp 224 in each entry and allowing a first threshold number of the rows with the largest data values 226 (above a second threshold) in each entry with timestamps 224 that are nearest to the current date and/or time (as compared to the timestamps 224 in all other rows in that entry) to remain the log 220 while deleting other rows in the log 220. Control then continues to block 510 where the controller 142 waits for an amount of time. Control then returns to block 505, as previously described above. In various embodiments, the controller 142 receives the threshold number and the amount of time to wait from the program 140 identified in the program identifier field 210, in each entry, from the user I/O device 121, from the computer 132 via the network 130, or from a designer of the controller 142. In another embodiment, a user removes selected rows from the log at times of the user's choosing.

In various embodiments, the logic of FIGS. 3, 4, and 5 execute concurrently, simultaneously, substantially simultaneously, asynchronously, or interleaved from each other via multi-threading, multi-processing, or multi-programming techniques.

In this way, in an embodiment, a user may learn of selected variables or data values of a program, some programs, or all programs approaching architected limits, without being overwhelmed by notifications every time that the variables change.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method performed by a computer system, comprising:
registering at least one limit record associated with a limited variable used by a program, each limit record containing a respective program identifier identifying the respective program which uses the respective limited variable with which the limit record is associated, a respective limit identifier identifying the respective limited variable with which the limit record is associated, a respective minimum value, and a respective increment value, the respective minimum value and the respective increment value specifying respective quantitative values associated with the respective limited variable used by the program;
in response to storing a data value to a stored variable during execution of an executing program, determining whether the executing program and stored variable correspond to a respective program and respective limited variable specified by a previously registered limit record;
responsive to determining that the executing program and stored variable correspond to a respective program and respective limited variable specified by a previously registered limit record, determining whether the data value that was stored to the stored variable is greater than the respective minimum value specified by the previously registered limit record and a metric of recent change in the data value that was stored to the stored variable exceeds the respective increment value specified by the previously registered limit record; and
responsive to determining that the data value that was stored to the stored variable is greater than the respective minimum value specified by the previously registered limit record and the metric of recent change in the data value that was stored to the stored variable exceeds the respective increment value specified by the previously registered limit record, storing the data value that was stored to the stored variable to a log associated with the previously registered limit record;
wherein the metric of recent change in the data value that was stored to the stored variable is based at least in part on a previously stored data value in the log associated with the previously registered limit record.

2. The method of claim 1,
wherein the metric of recent change in the data value that was stored to the stored variable comprises the absolute value of the data value that was stored to the stored variable minus the most recently logged data value that was previously stored to the stored variable.

3. The method of claim 1, further comprising:
responsive to determining that the executing program and stored variable correspond to a respective program and respective limited variable specified by a previously registered limit record, determining whether the data value that was stored to the stored variable is greater than the respective minimum value specified by the previously registered limit record and a most recently logged data value does not exist in the log associated with the previously registered limit record; and
responsive to determining that the data value that was stored to the stored variable is greater than the respective minimum value specified by the previously registered limit record and a most recently logged data value does not exist in the log associated with the previously registered limit record, storing the data value that was stored to the stored variable to the log associated with the previously registered limit record.

4. The method of claim 1, further comprising:
responsive to determining that the data value that was stored to the stored variable is greater than the respective minimum value specified by the previously registered limit record and the metric of recent change in the data value that was stored to the stored variable exceeds the respective increment value specified by the previously registered limit record, storing a user identifier that identifies a user that requested that the executing program be executed to the log associated with the previously registered limit record.

5. The method of claim 1, further comprising:
responsive to determining that the data value that was stored to the stored variable is greater than the respective minimum value specified by the previously registered limit record and the metric of recent change in the data value that was stored to the stored variable exceeds the respective increment value specified by the previously registered limit record, storing a job identifier that identifies a job that executed the executing program to the log associated with the previously registered limit record.

6. The method of claim 1, wherein the log associated with the previously registered limit record comprises a database, and wherein a trigger suspends execution of the executing program in response to the storing the data value that was stored to the stored variable to the log associated with the previously registered limit record.

7. The method of claim 1, wherein the log associated with the previously registered limit record comprises a database, and wherein a trigger notifies a user that the stored variable was changed by the increment value in response to the storing the data value that was stored to the stored variable to the log associated with the previously registered limit record.

8. The method of claim 1, wherein a plurality of programs register a plurality of limit records and wherein the limit data comprises a plurality of logs for the plurality of limit records.

9. A computer-readable storage medium encoded with instructions, wherein the instructions when executed comprise:
registering at least one limit record associated with a limited variable used by a program, each limit record containing a respective program identifier identifying the respective program which uses the respective limited variable with which the limit record is associated, a respective limit identifier identifying the respective limited variable with which the limit record is associated, a respective minimum value, and a respective increment value, the respective minimum value and the respective increment value specifying respective quantitative values associated with the respective limited variable used by the program;
in response to storing a data value to a stored variable during execution of an executing program, determining whether the executing program and stored variable correspond to a respective program and respective limited variable specified by a previously registered limit record;
responsive to determining that the executing program and stored variable correspond to a respective program and respective limited variable specified by a previously registered limit record, determining whether the data value that was stored to the stored variable is greater than the respective minimum value specified by the previously registered limit record and a metric of recent change in the data value that was stored to the stored variable exceeds the respective increment value specified by the previously registered limit record;

responsive to determining that the data value that was stored to the stored variable is greater than the respective minimum value specified by the previously registered limit record and the metric of recent change in the data value that was stored to the stored variable exceeds the respective increment value specified by the previously registered limit record, storing the data value that was stored to the stored variable to a log associated with the previously registered limit record; and wherein the metric of recent change in the data value that was stored to the stored variable is based at least in part on a previously stored data value in the log associated with the previously registered limit record.

10. The computer-readable storage medium of claim 9, further comprising:

responsive to determining that the executing program and stored variable correspond to a respective program and respective limited variable specified by a previously registered limit record, determining whether the data value that was stored to the stored variable is greater than the respective minimum value specified by the previously registered limit record and a most recently logged data value does not exist in the log associated with the previously registered limit record; and responsive to determining that the data value that was stored to the stored variable is greater than the respective minimum value specified by the previously registered limit record and a most recently logged data value does not exist in the log associated with the previously registered limit record, storing the data value that was stored to the stored variable to the log associated with the previously registered limit record.

11. The computer-readable storage medium of claim 9, further comprising:

responsive to determining that the data value that was stored to the stored variable is greater than the respective minimum value specified by the previously registered limit record and the metric of recent change in the data value that was stored to the stored variable exceeds the respective increment value specified by the previously registered limit record, storing a user identifier that identifies a user that requested that the executing program be executed to the log associated with the previously registered limit record.

12. The computer-readable storage medium of claim 9, further comprising:

responsive to determining that the data value that was stored to the stored variable is greater than the respective minimum value specified by the previously registered limit record and the metric of recent change in the data value that was stored to the stored variable exceeds the respective increment value specified by the previously registered limit record, storing a job identifier that identifies a job that executed the executing program to the log associated with the previously registered limit record.

13. The computer-readable storage medium of claim 9, wherein the log associated with the previously registered limit record comprises a database, and wherein a trigger suspends execution of the executing program in response to the storing the data value that was stored to the stored variable to the log associated with the previously registered limit record.

14. The computer-readable storage medium of claim 9, wherein the log associated with the previously registered limit record comprises a database, and wherein a trigger notifies a user that the stored variable was changed by the increment value in response to the storing the data value that was stored to the stored variable to the log associated with the previously registered limit record.

15. The computer-readable storage medium of claim 9, wherein a plurality of programs register a plurality of limit records and wherein the limit data comprises a plurality of logs for the plurality of limit records.

16. A computer comprising:

a processor; and memory communicatively coupled to the processor, wherein the memory is encoded with instructions, wherein the instructions when executed by the processor comprise registering at least one limit record associated with a limited variable used by a program, each limit record containing a respective program identifier identifying the respective program which uses the respective limited variable with which the limit record is associated, a respective limit identifier identifying the respective limited variable with which the limit record is associated, a respective minimum value, and a respective increment value, the respective minimum value and the respective increment value specifying respective quantitative values associated with the respective limited variable used by the program, in response to storing a data value to a stored variable during execution of an executing program, determining whether the executing program and stored variable correspond to a respective program and respective limited variable specified by a previously registered limit record, responsive to determining that the executing program and stored variable correspond to a respective program and respective limited variable specified by a previously registered limit record, determining whether the data value that was stored to the stored variable is greater than the respective minimum value specified by the previously registered limit record and a metric of recent change in the data value that was stored to the stored variable exceeds the respective increment value specified by the previously registered limit record, responsive to determining that the data value that was stored to the stored variable is greater than the respective minimum value specified by the previously registered limit record and the metric of recent change in the data value that was stored to the stored variable exceeds the respective increment value specified by the previously registered limit record, storing the data value that was stored to the stored variable to a log associated with the previously registered limit record; and wherein the metric of recent change in the data value that was stored to the stored variable is based at least in part on a previously stored data value in the log associated with the previously registered limit record, responsive to determining that the executing program and stored variable correspond to a respective program and respective limited variable specified by a previously registered limit record, determining whether the data value that was stored to the stored variable is greater than the respective minimum value specified by the previously registered limit record and a most recently logged data value does not exist in the log associated with the previously registered limit record, and responsive to determining that the data value that was stored to the stored variable is greater than the respective minimum value specified by the previously registered limit record and a most recently logged data value does not exist in the log associated with the previously registered limit record, storing the data value that was stored to the stored variable to the log associated with the previously registered limit record.

17. The computer of claim 16, wherein the instructions further comprise:

if the data value is greater than the minimum value, storing a job identifier that identifies a job that executed the program to the log of the limit identifier if an absolute value of the data value minus a most recently logged data value that was previously stored to the second variable is greater than the increment value; and responsive to determining that the data value that was stored to the stored variable is greater than the respective minimum value specified by the previously registered limit record and the metric of recent change in the data value that was stored to the stored variable exceeds the respective increment value specified by the previously registered limit record, storing at least one of (a) a user identifier that identifies a user that requested that the executing program be executed, or (b) a job identifier that identifies a job that executed the executing program, to the log associated with the previously registered limit record.

18. The computer of claim 16, wherein the log associated with the previously registered limit record comprises a database, and wherein a trigger suspends execution of the executing program in response to the storing the data value that was stored to the stored variable to the log associated with the previously registered limit record.

19. The computer of claim 16, wherein the log associated with the previously registered limit record comprises a database, and wherein a trigger notifies a user that the stored variable was changed by the increment value in response to the storing the data value that was stored to the stored variable to the log associated with the previously registered limit record.

20. The computer of claim 16, wherein a plurality of programs register a plurality of limit records and wherein the limit data comprises a plurality of logs for the plurality of limit records.

* * * * *